Oct. 1, 1940. E. M. DONS ET AL 2,216,188
METHOD OF MOLDING WAX
Filed Feb. 26, 1938
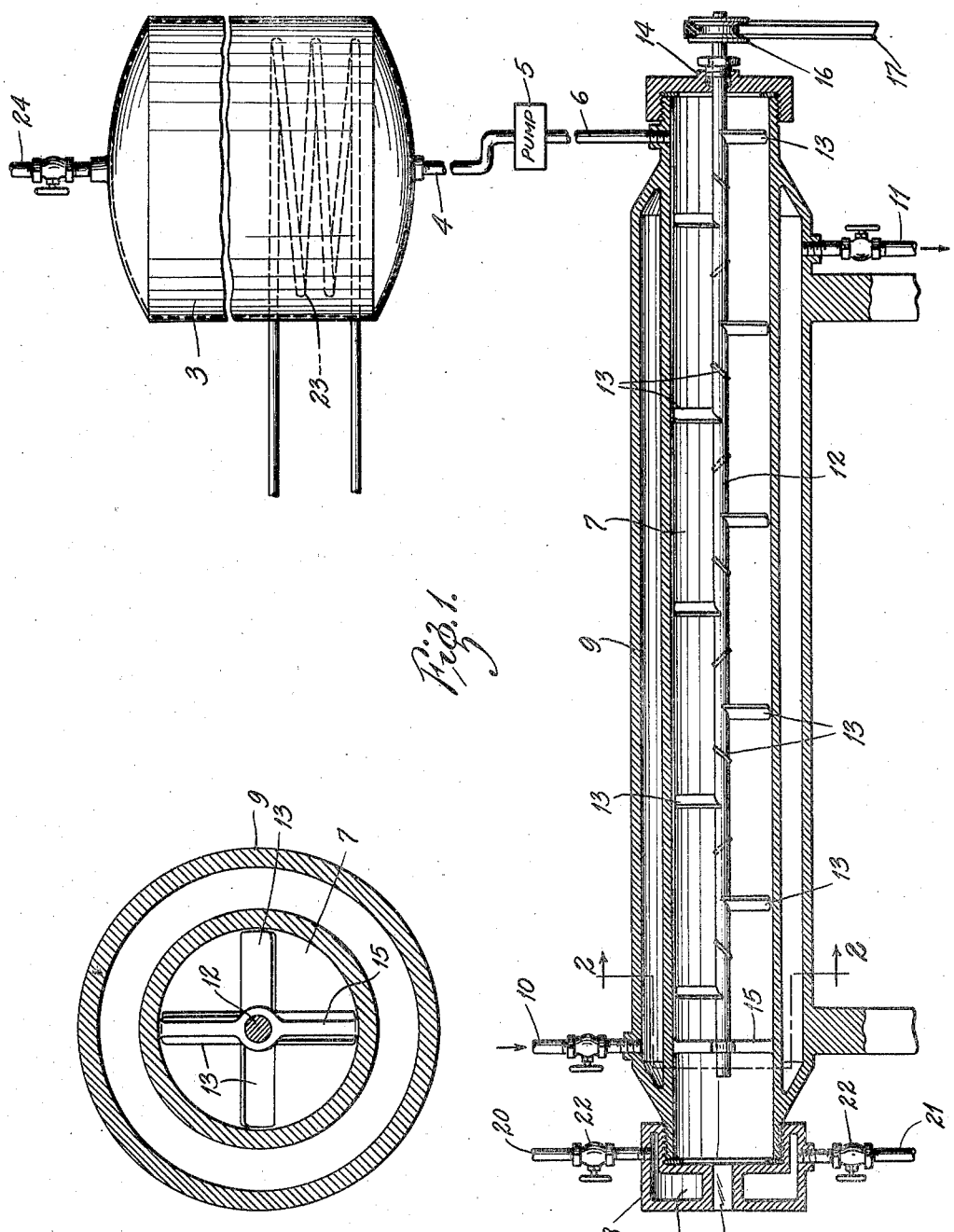
INVENTORS:
E. M. DONS,
O. G. MAURO,
By Albert J. McCauley
ATTORNEY.

Patented Oct. 1, 1940

2,216,188

UNITED STATES PATENT OFFICE 2,216,188

METHOD OF MOLDING WAX

Eddie M. Dons and Oswald G. Mauro, Tulsa, Okla., assignors to Mid-Continent Petroleum Corporation, Tulsa, Okla., a corporation of Delaware Application February 26, 1938, Serial No. 192,679

3 Claims. (Cl. 18—55)

This invention relates to methods of molding wax, and more particularly to a continuous method of converting wax into slabs. The invention may be employed in extruding various waxes through dies, but an outstanding feature appears in a combination of conditions which provide for the extrusion of high melting point amorphous wax made from petrolatum.

One of the problems lies in converting the mass of wax into the required plastic condition, not too hard nor too soft. A further difficulty appeared in adhesion of the wax to the die, and a third problem arises in the transmission of high pressure to the plastic wax so as to positively force it through the die.

An object of the invention is to produce and maintain all of the conditions required to continuously extrude the wax from a die. More specifically stated, an object is to positively convert a continuous stream of amorphous wax into an approximately predetermined plastic condition required for extrusion. Another object is to prevent adhesion of the wax to the die. A further object is to provide the high degree of pressure required for extrusion of the plastic wax, and to most effectively transmit this pressure through the wax.

With the foregoing and other objects in view, the invention comprises the novel method hereinafter more specifically described and shown in the accompanying drawing, which illustrates one form of the invention. However, it is to be understood that the invention comprehends changes, variations and modifications within the scope of the claims hereunto appended.

Fig. 1 is a diagrammatical view partly in section, illustrating an apparatus adapted for use in carrying out the new method.

Fig. 2 is an enlarged transverse section on the line 2—2 in Fig. 1.

To illustrate one form of the invention we have shown a heating chamber 3 adapted to contain wax in a molten condition, a discharge pipe 4 extending from the bottom of said chamber to a pump 5, a pipe 6 leading from the pump to one end of an elongated cooling chamber 7, and an extruding die 8 for the discharge of plastic wax at the opposite end of said elongated chamber.

A cooling jacket 9 surrounding the cooling chamber 7, is provided with an inlet pipe 10 near the discharge end of said chamber, and an outlet pipe 11 near the opposite end. Cool water, or any other suitable cooling fluid, may be admitted through the pipe 10 and discharged through the pipe 11. Each of these pipes is provided with a valve to regulate the flow of cooling fluid, so the temperatures of the stream of wax can be rather accurately controlled, one of the objects being to gradually convert the wax into a predetermined plastic condition as it advances toward the extruding die 8.

The elongated cooling chamber contains an agitator which may be in the form of a shaft 12 provided with fingers 13. This shaft extends through a stuffing box 14 at one end of said chamber, and its inner end is mounted in a bearing 15 separated from the extruding die. A pulley 16 on the outer end of the shaft may be driven by a belt 17.

This agitating device is constantly rotated to stir the stream of wax while it is being converted from a liquid to a plastic condition. Such agitation is important, as it prevents the formation of a solid crystalline wax structure, and results in substantially uniform cooling throughout the mass, thereby providing a uniform mass of wax, instead of a heterogeneous mixture of solids, liquids and semi-solids. The agitation also prevents adhesion of sticky wax to the walls of the cooling chamber.

The extruding die 8 is a hollow device having a central discharge opening 18 surrounded by a chamber 19 to which inlet and discharge pipes 20 and 21 are connected. Valves 22 in these pipes are regulated to control the flow of heating or cooling fluid through the chamber 19. The temperature of the die itself can be thus controlled and separately regulated to approximately predetermine the condition of the outgoing wax, one of the objects being to maintain the molding faces of the die at a temperature which places the surface of the outgoing wax in a substantially non-adhesive condition.

The ultimate condition of the wax is determined partly by the temperature and rate of flow of the incoming molten stream, and partly by the temperature and rate of flow of cooling fluid in the jacket 9, but the more or less violent agitation of the flowing stream is an important factor, and the final temperature control at the extruding die is also desirable to positively obtain or maintain the special plastic condition required for proper extrusion, at the same time preventing adhesion of wax to the die.

The various conditions existing in the stream as it progresses along the cooling chamber 7 can not be accurately controlled, and in some cases it may be necessary or desirable to increase the temperature at the extruding die, but the regulation herein disclosed provides for either heating or cooling at the die, and in most of our work we found it advisable to cool the die and thereby prevent objectionable sticking of the wax to the faces of this die.

It is to be understood that the agitating fingers 13 are not relied upon to force the wax through the die. The high degree of pressure required for this extruding operation is transmitted from the pump 5, to the liquid stream of molten wax, and thence through the semi-liquid and plastic portions of the advancing stream, to the ultimate plastic product at the die. Actual tests of the invention have shown that this method of transmitting pressure through the varying stream of wax is entirely satisfactory. It overcomes the problems that would appear in attempts to apply the required mechanical pressure directly to the plastic wax.

The heating chamber 3 may be provided with a heating coil 23, or any other suitable means to heat the wax to a temperature above its melting point. In refining the wax, it is usually subjected to distillation for the purpose of removing solvents, etc., and the molten wax can be economically transmitted from the still to our extrusion system without adding heat to the wax. For example, the heating chamber 3 may be regarded as a still having a vapor pipe 24 at the top for the discharge of vaporized solvents and impurities, which pass from the molten wax. Instead of transmitting this molten wax to storage, it can be retained in liquid condition while passing to the pump 5, thereby eliminating the cost of special heating to prepare the wax for the present invention.

As a specific example of the new process, we will refer to a high melting point amorphous wax obtained from petrolatum. This wax having a melting point above 150° F. is more or less sticky at temperatures down to about 105° F. While this wax is in the pump 5 its temperature may be about 5° F. above the melting point, for example, about 175° F. Satisfactory results can then be obtained by gradually cooling the stream of wax to a temperature of about 80° F. to about 105° F. at the discharge end of the elongated cooling chamber. This discharge temperature at the die can be separately regulated as previously described to insure the required flow of the wax along the faces of the die.

We claim:

1. In the art of molding wax, the method which comprises forcing a continuous stream of hot molten wax into the entrance of an elongated passageway, cooling and solidifying the wax as it progresses along said passageway, at the same time forcibly agitating the cooled stream to prevent the formation of a heterogeneous mixture of liquid and solid wax, regulating the cooling to gradually solidify the agitated stream of wax while converting it from a liquid at said entrance to a plastic condition at the discharge end of said passageway, extruding the wax from said discharge end, cooling the extruding faces to a temperature lower than the temperatures at which the wax is adhesive, and transmitting the extruding pressure from said continuous molten stream outside of said passageway, to the agitated portions of the stream undergoing solidification in said passageway, and thence to the non-adhesive wax between said extruding faces.

2. In the art of molding wax, the method which comprises maintaining a continuous stream of the wax in a molten condition at a temperature above 150° F., forcing the molten stream into the entrance of an elongated passageway, cooling and solidifying the stream of wax as it progresses along said passageway, at the same time forcibly agitating the cooled stream to prevent the formation of a heterogeneous mixture of liquid and solid wax, regulating the cooling to gradually solidify the agitated stream of wax while converting it from a liquid at said entrance to a plastic condition at the discharge end of said passageway, extruding the wax from said discharge end and maintaining the extruding faces at a temperature between about 80° F. and 105° F. to prevent adhesion of the wax to said extruding faces, and transmitting all of the extruding pressure from said molten stream at a temperature above 150° F. to the agitated portions of the stream undergoing solidification in said passageway, and thence to the non-adhesive wax between said extruding faces.

3. In the art of molding wax, the method which comprises heating wax to a temperature above its melting point and thereby distilling impurities from the molten wax, forcing a continuous stream of the hot molten wax from the distilling apparatus to the entrance of an elongated passageway, cooling and solidifying the continuous stream of wax as it progresses along said passageway, at the same time forcibly agitating the cooled portion of the stream, extruding the cooled wax from the discharge end of said passageway, separately regulating the cooling at the said discharge end to a temperature lower than the temperatures at which the wax is adhesive to prevent adhesion of the wax to the extruding faces, and transmitting all of the extruding pressure from said molten stream outside of said passageway to the agitated portions of the stream undergoing solidification in said passageway, and thence to the non-adhesive wax between said extruding faces.

EDDIE M. DONS.
OSWALD G. MAURO.